United States Patent
Klocek et al.

Patent Number: 5,532,048
Date of Patent: Jul. 2, 1996

[54] POLYMERIC INFRARED OPTICAL PROTECTIVE COATING

[75] Inventors: Paul Klocek, Dallas; James T. Hoggins, Plano, both of Tex.

[73] Assignee: Texas Instruments Incorporated, Dallas, Tex.

[21] Appl. No.: 180,091

[22] Filed: Jan. 11, 1994

Related U.S. Application Data

[62] Division of Ser. No. 939,256, Sep. 2, 1992, Pat. No. 5,324,586.

[51] Int. Cl.$^6$ ........................................................ B32B 27/36
[52] U.S. Cl. ........................ 428/215; 428/412; 428/419; 428/421; 428/435; 428/441; 428/442; 428/474.4; 428/333; 428/521; 428/522; 428/913
[58] Field of Search .................................... 428/215, 412, 428/419, 421, 435, 441, 442, 474.4, 521, 522, 913

[56] References Cited

U.S. PATENT DOCUMENTS 5,324,586  6/1994  Klocek et al. ........................ 428/412

Primary Examiner—P. C. Sluby
Attorney, Agent, or Firm—René E. Grossman; Richard L. Donaldson

[57] ABSTRACT

A protectively coated optical device which includes an infrared transmissive optical surface and an infrared transmissive polymer coating on the surface having low hardness, high strength and low elastic (Young's) modulus and is transmissive in the 8 to 12 micrometer wavelength range. The hardness is less than 50 kg/mm$^2$, the strength is from about 10,000 to about 100,000 psi and the elastic (Young's) modulus is from about $0.2 \times 10^6$ to about $3 \times 10^6$ psi. The polymer is one of propylene, diene, polyamides, styrene, copolymers thereof and ethylene-octene copolymer, polyvinylpyrrolidene, poly(acenaphthylene), styrene/ethylenebutylene copolymer, poly(1-butene), polybrene, poly(acrylic acid, ammonium salt), polyamide resin, ethylene/propylene copolymer and ethylene/propylene/diene terpolymer, which are infrared (8 to 12 micrometers) transparent and neoprene, polyurethane, fluorelastomer, polycarbonate, polyether sulfone, polyether ether-ketone, tetcel and polyacrylate which are rain erosion resistant and combinations thereof.

8 Claims, 1 Drawing Sheet

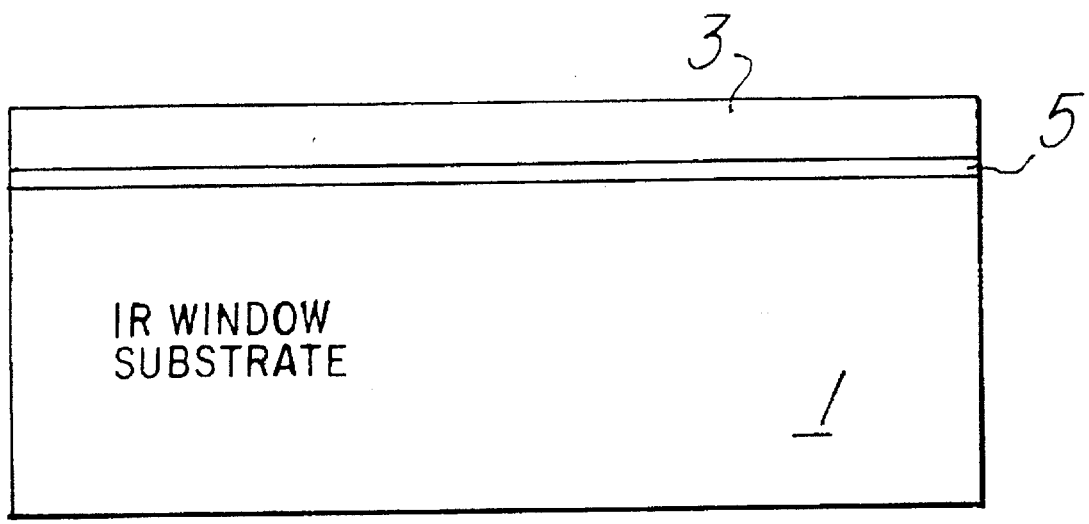

POLYMERIC INFRARED OPTICAL PROTECTIVE COATING

This application is a division of application Ser. No. 07/939,256, filed Sep. 2, 1992, now U.S. Pat. No. 5,324,586.

BACKGROUND OF THE INVENTION

1. Field of the Invention

This invention relates to optical coatings for infrared windows and domes, primarily for use on aircraft, and, more specifically to a polymer or plastic optical coating to protect infrared optics, particularly infrared window and domes.

2. Brief Description of the Prior Art

To increase the survivability and operational capability of infrared windows and domes, particularly as used during flight and particularly for the 8 to 12 micrometer wavelength region, protective coatings are required for rain, dust and sand and hail impact. The impact of these particles during flight (aircraft, missile, helicopter, etc.) on the window or dome erodes the window or dome, thereby reducing its strength and ability to transmit infrared therethrough. This degradation can render the electro-optical sensor behind the dome or window inoperable or even damaged should the window or dome catastrophically fail.

Presently used prior art infrared windows and domes degrade in performance due to loss of transmission and strength due to environmental degradation, particularly due to erosion by rain, dust and sand particles at aerodynamic speeds.

Prior art solutions to this problem have involved the use of a protective coating on the infrared domes and windows. Due to the requirement that the protective coating must be transparent in the wavelength region in which the window or dome operates (i.e., 8 to 12 micrometers, 3 to 12 micrometer, 3 to 5 micrometerns, 1 to 12 micrometer, etc.), past and current efforts on protective coatings have concentrated on traditional inorganic materials, such as silicon, gallium phosphide, boron phosphide, diamond, germanium carbide, silicon nitride, silicon carbide, oxides, etc. to obtain the desired transparency. These coating have displayed high strength, high fracture toughness, high hardness and moderate to high elastic (Young's) modulus.

The general mechanical requirements of coatings for soft (rain) and hard (sand, hail, dust, etc.) particle impact protection of substrates are low hardness and high fracture toughness or strength with a high elastic modulus to reduce the strain induced in the substrate or a low elastic modulus to absorb the impact stress. Accordingly, the above-mentioned materials have shown only limited effectiveness in solving the problem of erosion due to particle impact and have been difficult to scale up in size. It is therefore apparent that other solutions to the problem are required which overcome or minimize the problems presented by prior art solutions.

SUMMARY OF THE INVENTION

In accordance with the present invention, there are provided polymeric coatings for infrared windows and domes which are infrared transparent polymers with low hardness and high strength. These polymers absorb and distribute the stresses of the impacting particles, thereby protecting the underlying infrared optics, primarily infrared windows and domes and primarily but not limited to the 8 to 12 micrometer wavelength range.

A polymeric infrared transmitting coating has been found to be very effective in providing the required protection for infrared windows and domes. Such materials are inexpensive and readily available in films which can be placed on the exterior surface of an infrared window or dome. Polymers have been overlooked in the past for use as infrared optical protective coatings, apparently due to their well-known absorption bands throughout the infrared range. These bands are the intrinsic molecular vibrational absorption due to the constituents of the polymer (i.e., C-H stretching, bending modes). However, on detailed analysis of the infrared spectra of various polymers, some are highly transparent in, for example, the 8 to 12 micrometer region where considerable interest/application exists for electro-optical systems. These same 8 to 12 micron transparent polymers and copolymers, such as, for example, polyethylene, ethylene-octene copolymer, polyvinylpyrrolidene, poly(acenaphthylene), styrene/ethylenebutylene copolymer, poly(1-butene), polybrene, poly(acrylic acid, ammonium salt), polyamide resin, ethylene/propylene copolymer and ethylene/propylene/diene terpolymer possess low hardness, high strength and low elastic (Young's) modulus, making them candidates particle impact/erosion resistant coatings for infrared windows and domes.

The polymers of choice are those that provide infrared transmissivity in the desired wavelength range, such as, for example, 8 to 12 micrometers, low hardness less than about 50 kg/mm$^2$, high strength in the range of 10,000 to 100,000 psi with a preferred value of greater than 20,000 psi and low elastic (Young's) modulus in the range of 0.2 to 3'10$^6$ psi and preferably less than 0.5×10$^6$ psi. Most polymers do not display transmissivity in the infrared range and it has been generally believed that polymers in general do not display such transmissivity and are absorbent to infrared energy. In those cases were the polymers provide the desired optical properties but fail to provide the desired mechanical properties, copolymers of the optically desirable polymers and other polymers which provide the desired mechanical properties can be formulated to provide a compromise which still presents the critical properties in the desired ranges. The ethylene-octene copolymer is an example of such copolymer. Additional copolymers or terpolymers are desirable to optimize the optical transparency and the mechanical and thermal properties, particularly strength and thermal stability. Candidates include polyethylene, ethylene-octene copolymer, polyvinylpyrrolidene, poly(acenaphthylene), styrene/ethylenebutylene copolymer, poly(1-butene), polybrene, poly(acrylic acid, ammonium salt), polyamide resin, ethylene/propylene copolymer and ethylene/propylene/diene terpolymer, which are infrared (8 to 12 micrometers) transparent and neoprene, polyurethane, fluorelastomer, polycarbonate, polyether sulfone, polyether ether-ketone, tetcel and polyacrylate which are very rain erosion resistant. Also, the copolymers can be tailored to provide vibrational modes of the atoms therein at frequencies outside of the optical frequency range of interest to possibly provide the desired transmissivity in the frequency range of interest.

The sheet of polymeric material is placed on the optical window or dome in any of many well known ways, such as, for example, by static or chemical bond with or without an intermediate "glue" layer, as required, spinning on, spraying on or cast on and allowed to set.

BRIEF DESCRIPTION OF THE DRAWING

The FIGURE is a schematic drawing of an optical window with protective coating thereon in accordance with the present invention.

DESCRIPTION OF THE PREFERRED EMBODIMENT

A layer of ethylene-octene copolymer was provided having a thickness of 50 microns. It was found to show 85% transmission in the 8 to 12 micrometer wavelength range. This copolymer film was applied to a ZnS test infrared window sample. The transmission of the ZnS with the copolymer coating thereon was excellent in the 8 to 12 micrometer range. A sandblasting test, simulating a very harsh high speed sand environment of aircraft or helicopter was performed on a sample of ZnS with and without the polymer coating. After 60 seconds in the sandblaster, the uncoated ZnS was severely eroded and useless as an infrared window. The copolymer (ethylene-octene) coated ZnS after 5 minutes in the sandblaster was still useable as an infrared window. This five times longer exposure with less erosion is very dramatic evidence of the application of the particular copolymer tested and is indicative that other polymers will provide similar results as protective coatings for infrared optics. The polymers should perform as well with regard to rain erosion. A microscopic investigation of the sandblasted bare ZnS and the copolymer coated ZnS showed virtually no damage to the copolymer coated ZnS and excessive damage to the bare ZnS. This demonstrates the dramatic effectiveness of the polymer in protecting the infrared window.

Other polymers that can be used are polyethylene, propylene, diene, various copolymers, polyamide styrene, etc. which can be used to protect various infrared window materials, such as GaAs, ZnS, ZnSe, Ge, GaP, etc.

Referring to the FIGURE, there is shown an infrared window 1 which acts as a substrate having a polymer coating 3 thereon in accordance with the present invention. It is preferred that the polymer coating 3 bond directly to the window either chemically or mechanically. If this cannot be accomplished, a "glue layer" 5 can be used therebetween. The thickness of the polymer coating 3 is such that it provides the desired protection under the conditions to be encountered and also is sufficiently light transmissive in the range of interest.

Though the invention has been described with respect to a specific preferred embodiment thereof, many variations and modifications will immediately become apparent to those skilled in the art. It is therefore the intention that the appended claims be interpreted as broadly as possible in view of the prior art to include all such variations and modifications.

We claim:

1. A method of protecting an optically transmissive surface, comprising the steps of:
   (a) providing an optically transmissive surface for transmission of infrared light frequencies; and
   (b) providing a polymer as a protective coating for said optically transmissive surface for transmission of infrared light frequencies which is optically transmissive in said infrared frequency range and which has low hardness, high strength and low elastic (Young's) modulus.

2. The method of claim 1 wherein said surface and said polymer has a thickness of at least about 25 microns.

3. The method of claim 1 wherein said polymer has a hardness less than 50 kg/mm$^2$, a fracture toughness from about 10,000 to about 100,000 psi and an elastic (Young's) modulus from about $0.2\times10^6$ to about $3\times10^6$ psi.

4. The method of claim 3 wherein said surface and said polymer has a thickness of at least about 25 microns.

5. The method of claim 3 wherein said polymer is taken from the group consisting of propylene, diene, polyamides, styrene and copolymers thereof, polyethylene, ethylene-octene copolymer, polyvinylpyrrolidene, poly(acenaphthylene), styrene/ethylene-butylene copolymer, poly(1-butene), polybrene, poly(acrylic acid, ammonium salt), polyamide resin, ethylene/propylene copolymer and ethylene/propylene/diene terpolymer, which are infrared (8 to 12 micrometers) transparent and neoprene, polyurethane, fluorelastomer, polycarbonate, polyether sulfone, polyether etherketone, tetcel and polyacrylate which are rain erosion resistant and combinations thereof.

6. The method of claim 5 wherein said surface and said polymer has a thickness of at least about 25 microns.

7. The method of claim 1 wherein said polymer is taken from the group consisting of propylene, diene, polyamides, styrene and copolymers thereof, polyethylene, ethylene-octene copolymer, polyvinylpyrrolidene, poly (acenaphthylene), styrene/ethylene-butylene copolymer, poly(1-butene), polybrene, poly (acrylic acid, ammonium salt), polyamide resin, ethylene/propylene copolymer and ethylene/propylene/diene terpolymer, which are infrared (8 to 12 micrometers) transparent and neoprene, polyurethane, fluorelastomer, polycarbonate, polyether sulfone, polyether ether-ketone, tetcel and polyacrylate which are rain erosion resistant and combinations thereof.

8. The method of claim 7 wherein said surface and said polymer has a thickness of at least about 25 microns.

* * * * *